United States Patent [19]

Hong et al.

[11] 3,745,525

[45] July 10, 1973

[54] ERROR CORRECTING SYSTEM

[75] Inventors: Se J. Hong, Poughkeepsie; Arvind M. Patel, Wappingers Falls, both of N.Y.

[73] Assignee: International Business Machines Corporation, Armonk, N.Y.

[22] Filed: Dec. 15, 1971

[21] Appl. No.: 208,258

[52] U.S. Cl. .......................................... 340/146.1 AL
[51] Int. Cl. ......................... H04l 1/10, G08c 25/00
[58] Field of Search ........................... 340/146.1 AL

[56] References Cited

UNITED STATES PATENTS 3,601,798 8/1971 Hsiao ......................... 340/146.1 AL

*Primary Examiner*—Malcolm A. Morrison
*Assistant Examiner*—R. Stephen Dildine, Jr.
*Attorney*—Harold H. Sweeney Jr., et al.

[57] ABSTRACT

An error correcting system is provided for information sequences divided into bytes of $b$ bits each. The information is encoded in accordance with an H matrix consisting of a predetermined number of submatrices, each of which operates on distinct partitioned portions of the sequence of message bytes. Each of the submatrices are concatenated iteratively by $b$ so that the submatrices can be designated by $H_{r,b}$; $H_{(r-b),b}$; $H_{(r-2b),b}$ . . . $H_{(2b+c),b}$ where $r = kb+c$ and $0 \leq c < r$. Bytes of check bits are generated in accordance with the H matrix and are added to the message sequence before utilization. A syndrome is generated from the information, after it is utilized, in accordance with said H matrix and, after being decoded, generates error pointers which indicate which of the bits in a byte of the message sequence are in error. The bits identified as being in error are corrected.

9 Claims, 9 Drawing Figures

SCHEMATIC REPRESENTATION OF THE PARITY CHECK MATRIX IN FIG. 1

PARITY CHECK MATRIX, BYTE DESIGNATIONS AND PARTITION DESIGNATIONS

SCHEMATIC REPRESENTATION OF THE PARITY CHECK MATRIX IN FIG. 1

SYNDROME DECODERS

EXAMPLE OF ERROR POINTER GENERATOR

OPTIONAL ERROR POINTER FOR THE CHECK BYTE $C_3$

ERROR CORRECTING SYSTEM

BACKGROUND OF THE INVENTION

The invention relates to an error correcting system and, more particularly, to an error correcting system for correcting a $b$ bit byte in a message regardless of the number of bits in said byte which are in error.

The use of error correcting codes to improve reliability is becoming a standard procedure in modern computers. Especially in the memory, be it a core, disk file, a tape or monolithic, and in the straight data transfer path, benefits of error correcting codes are clearly recognized.

Random-error-correcting codes are suitable for bit-per-card or some homogeneous bit arrangements. Increasing speed and system efficiency demands have pushed the idea of bit-per-card to a cluster of bits-per-card type memory organization and, likewise, the data paths usually transfer the cluster of bits in parallel. This cluster of bits is often called a byte and hence, the name, byte oriented machine, describes most of the modern computers. A single fault in the system, either in the memory or in the data paths, is likely to affect many bits within a byte. Consequently, a byte-error correcting capability is demanded of the codes to be used in these systems. The known multiple random-error-correcting codes, which do not make use of the error dependency within the byte require unduly high redundancy and complicated decoding procedure.

Another application of byte-correcting code is in multi-channel digital systems where the channel noise often affects more than one adjacent bit in each channel independently. A fixed size cluster of bits in each channel, when viewed as a byte, lends itself to the application of byte-error-correcting codes. Accordingly, a byte means a cluster of $b$ bits of data that are likely to be affected together by channel noise or some hardware fault, due to the circuit packaging method of data format in recording. The byte length $b$, in general, is any positive integer.

It is well known that the error correcting code for symbols from GF $(2^b)$, (the Galois FIeld of $2^b$ elements) can be used for correction of byte errors. In all these byte error correcting codes, each check symbol in GF $(2^b)$ is expressed by $b$ binary check digits and each information symbol in GF $(2^b)$, likewise, is expressed by $b$ binary information digits. All encoding and decoding operations are performed on these clusters of $b$ binary digits, thus obtaining b-adjacent correction corresponding to the correction of a symbol in GF $(2^b)$.

A new class of codes for single-byte-error correction is presented. The code is general in that the structure does not depend upon symbols from GF $(2^b)$. A byte is not equated to a symbol from GF $(2^b)$, but rather treated as a convenient cluster of the individual bits. Check bits may or may not be clustered as bytes and the number of check bits may be arbitrary. This class of codes contains subclasses which are equivalent to all single symbol correcting codes over GF $(2^b)$ including the binary Hamming codes. These codes are easily implementable and are considered to be either perfect or maximal.

Error-correcting systems which are capable of correcting all the digits in a character or byte of information are known, for example, U. S. Pat. No. 3,319,223, "An Error Correcting System," issued on May 9, 1967, describes an error-correcting system in which a plurality of multi-digit information characters followed by two associated multi-digit check characters can be operated on by a check character recalculating circuit that is respectively identical to the check generating circuits included in the transmitting terminal. The arrangement is limited in that only two check characters can be generated and the arrangement introduces a delay approximately equal to the period of one of the message blocks.

It is an object of the present invention to provide an improved system for correcting all the bits in error in an erroneous byte of information.

It is another object of the present invention to provide a system capable of byte-error correction with practically no delay.

It is a further object of the present invention to provide a byte-error-correction system in which the code is maximal, that is, the minimum number of check bits are used for the given information length.

SUMMARY OF THE INVENTION

In the error correcting system of the invention, the information sequence is divided into bytes of $b$ bits each. The information is encoded in accordance with an overall matrix H which contains a predetermined number of submatrices each of which operates on distinct partitioned portions of the sequence of message bytes. Each of the submatrices are concatenated iteratively by $b$ bits so that the submatrices can be designated by $H_{r,b}$; $H_{(r-b),b}$; $H_{(r-2b),b} \cdots H_{(2b+c),b}$ where $r = kb+c$ and $0 \leq c < r$. Check bits are generated in accordance with the grouping of the information in accordance with the H matrix and are added to the message sequence before utilization. A syndrome is generated in accordance with the encoded message groups and said generated check bits after utilization. The syndrome is decoded and utilized to generate error pointers which indicate which of the bits in a byte of the message sequence is in error. The bits identified as being in error are corrected.

GENERAL DESCRIPTION

Figure 1:
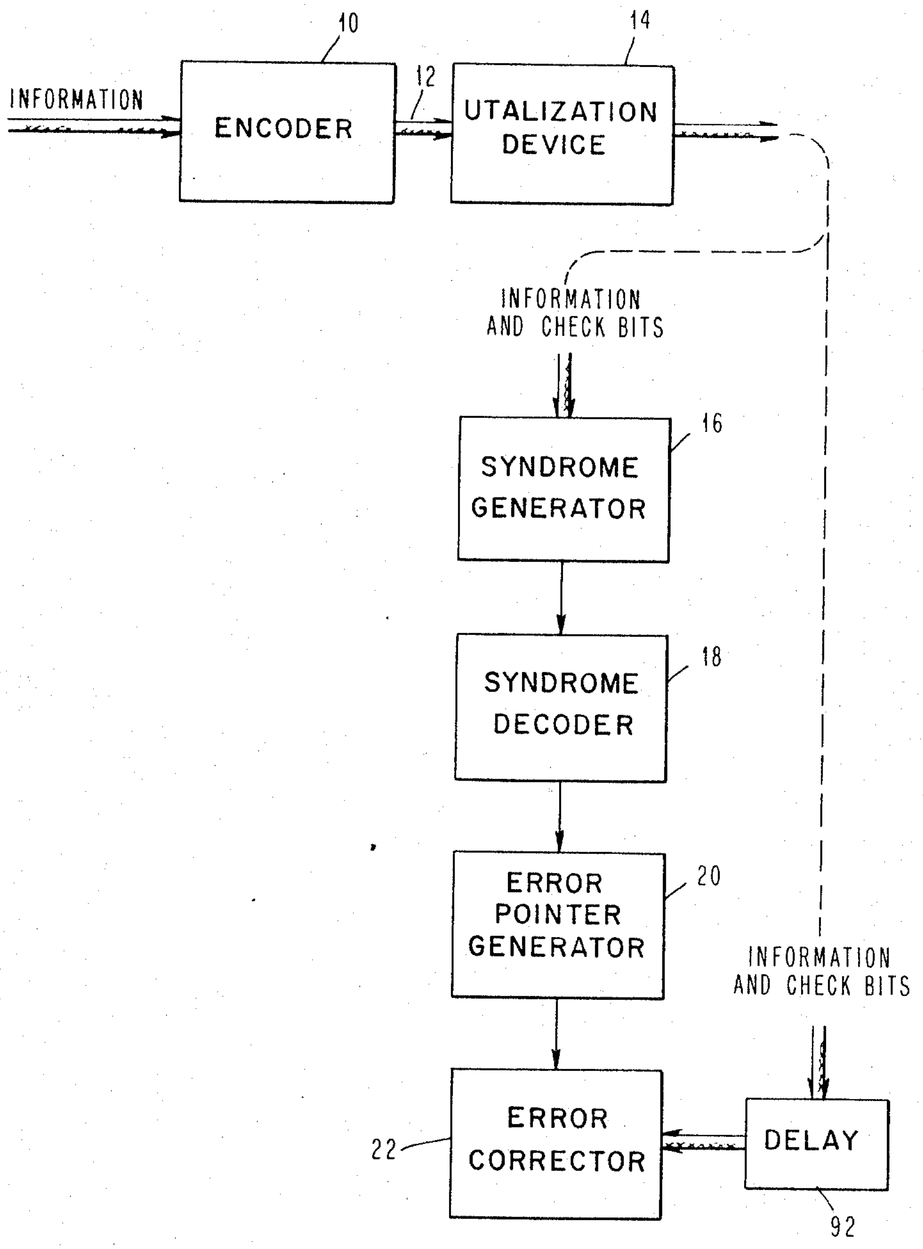
FIG. 1 is a block diagram of the system in which the present invention is used.

Referring to FIG. 1, the data in the form of bytes of $b$ is shown entering an encoder 10 where check bits which are generated by a parity check matrix which will subsequently be developed, are added to the message. The encoded message 12 and the generated check bits are utilized in a utilization device 14 such as a memory or other portion of a byte oriented data processing system. The data after being so utilized is decoded to correct any errors which have been introduced within an individual byte. The decoding is accomplished by generating a syndrome in a syndrome generator 16 in accordance with the same parity check matrix utilized for generating the check bits. The syndrome is decoded in syndrome decoder 18 and error pointers are generated in error pointer generator 20 to indicate what bits in any one byte are in error. These bits pointed to as being in error are inverted in error corrector 22, to correct the message.

It will be appreciated by those skilled in the art that this invention can be applied to information handling systems of various capacities. The invention, will, therefore, be described in algebraic terms which are applicable to any size system and subsequently in terms of a specific system example.

In order to develop the matrix theory by means of which the encoding and check bit generation of the code can better be understood, a few mathematical notations must be developed. These are the zero-concatenator, the truncator and the companion matrix.

Given a vector length $d$, the zero-concatenator operator $\Phi_{r,d}$ is defined as the following $r \times d$ matrix:

$$\Phi_{r,d} = [I_d/(O_{r-d,d})]\ _{r,\ (r \geq d)} \qquad (1)$$

where $I_d$ is a $d \times d$ identity matrix and O denotes an all 0 matrix. If v is a column vector of length $d$, it can be seen that, for $r \geq d$, $$[\Phi_{r,d}]\cdot[v] = \begin{bmatrix} v\ \underbrace{0\ 0\ 0 \ldots 0}_{r-d \text{ zeros}} \end{bmatrix}^T \qquad (2)$$

where T indicates the transpose function. The resultant vector is an $r$-$d$ concatenation to the original vector $v$.

The truncator operator $\mp_{d,r}$ is naturally defined as a $d \times r$ matrix:

$$\mp_{d,r} = [\ I_d\ |\ O_{d,r-d}\ ] = \Phi_{r,d}{}^T \qquad (3)$$

Obviously, if $v = [v_1, v_2 - v_d, v_{d+1}, - v_r]^T$ $$[\ \mp_{d,r}\ ]\cdot[\ v\ ] = [\ v_1, v_2, \ldots, v_d\ ]^T \qquad (4)$$

which is a truncation of ($r$-$d$) bits from $v$. Furthermore, the truncation on the concatenation is an identity operation and $\mp_{d,r}$ is a left inverse of $\Phi_{r,d}$, i.e., $$[\ \mp_{d,r}\ ]\ [\ \Phi_{r,d}\ ] = [\ I_d\ ] \qquad (5)$$

GIven a polynomial $a(x)$ of degree $d$, the companion matrix T corresponding to $a(x)$ is defined as the following:

$$a(x) = \sum_{i=0}^{d} a_i x^i,\ a_0 = a_d = 1$$

$$T = \left[\begin{array}{c|c} 000\ \ldots\ 00 & a_0 \\ \hline I_{d-1} & \begin{array}{c} a_1 \\ a_{d-1} \end{array} \end{array}\right] (d \times d) \qquad (6)$$

An equivalent definition of T is that the $i^{th}$ ($1 \leq i \leq d$) column of T is the same as the coefficient vector of $x^i$ mod $a(x)$. Some of the useful properties of the companion matrix are:

Property 1

Let e be the exponent of $a(x)$, i.e., $y = e$ is the least positive solution of $x^y = 1$ mod $a(x)$.

*i.* T is non singular;

*ii.* $T^0 = T^e = I_d$

*iii.* $T^i = T^j$ if $i \equiv j$ mode $e$

Property 2

The $i^{th}$ column of $T^j$ is the same as the coefficient vector of the ($d$-1) degree polynomial $x^{i+j-1}$ mod $a(x)$.

Property 3

Let $v$ be the coefficient column vector of $$v(x) = \sum_{i=0}^{d-1} v_i x^i$$

and $v'$ *for*

$$v'(x) = \sum_{i=0}^{d-1} v_i' x^i \cdot T^i \cdot v = v',$$

if and only if, $x^i v\ (x) = v'\ (x)$ mod $a(x)$.

If $\alpha$ is a primitive element in (Galois Field) GF($2^r$) and a root of a primitive polynomial $g(x)$ of degree $r$, the companion matrix T can be also described as the following, since $\alpha^i$ is the coefficient vector of $x^i$ mod $g(x)$.

$$T = [\ \alpha\ \alpha^2\ \alpha^3 \ldots \alpha^r\ ],\ T^i = [\ \alpha^{i+1},\ \alpha^{i+2} \ldots \alpha^{i+r}\ ] \qquad (7)$$

The right-multiplication of the zero concatenator on T (or $T^i$) yields:

$$[\ T\ ],\ [\ \Phi_{r,d}\ ] = [\ \alpha\ \alpha^2 \ldots \alpha^d\ ] \qquad (8)$$

which is, interestingly, ($r$-$d$) column — truncation of the original T matrix.

We now prove a theorem for the discussions to follow.

Theorem 1

Let e be the exponent of an irreducible polynomial $a(x)$ of degree $d$. Let $v(x) \neq 0$ be any polynomial of degree $m$ or less. Then:

$$x^i\ v(x) + x^j\ v(x) \equiv 0 \bmod a(x) \qquad (9)$$

implies:

$$i \equiv j \mod e \qquad (10)$$

if and only if:

$$m < d \qquad (11)$$

Proof

From equation (9), $(1 + x^{j-i})\, v(x) \equiv 0 \mod a(x)$. If equation (11) holds, GCD $(v(x), a(x)) = 1$ and hence:

$$(1 + x^{j-i}) \equiv 0 \mod a(x)$$

which implies equation (10). If $m \nless d$, let $m = d$ and $v(x) = a(x)$. This violates the implication of equation (10). Q.E.D.

Corollary 1

Let $e$, $a(x)$, and $d$ be defined as in Theorem 1 and let T be the companion matrix of $a(x)$. Let $v$ be any column vector of length $p$, $p \leq d$.

Then:

$$T^i \Phi_{d,p}\, v + T^j \Phi_{d,p}\, v = 0 \qquad (12)$$

implies:

$$i \equiv j \mod e \qquad (13)$$

A natural way of describing the code structure of the invention is in terms of its parity check matrix. The check portion with given $r$ check bits will be represented by an identity matrix $I_r$. Since each byte is not treated as a symbol from $GF(2^b)$ but rather considered as a cluster of $b$ individual bits, there is no restriction on $r$. In general, $r = kb + c$ where $0 \leq c < b$. The leftover $c$ check bits, if any, may form a special check byte. Another way of handling the leftover check bits is to form $k$-1 regular size check bytes and allow a special check byte of length $b + c$. The byte partitioned identity matrix can be represented in the following manner:

$$I_r = \left[\begin{array}{ccccc} I_b & & & & \\ & I_b & & & \\ & & \ddots & & \\ & & & I_b & \\ & & & & I_{b+c} \end{array}\right] \Bigg\} (k-1)\, I_b\text{'s} \qquad (15)$$

Given $r$ check bits and byte length $b$, consider the following matrix $H_{r,b}$ where $r \geq 2b$.

$$H_{r,b} = \left[\begin{array}{c|c|c|c} \begin{matrix} 1 & & & \\ & 1 & & \\ & & \ddots & \\ & & & 1 \end{matrix} & \begin{matrix} 1 & & & \\ & 1 & & \\ & & \ddots & \\ & & & 1 \end{matrix} & \begin{matrix} 1 & & & \\ & 1 & & \\ & & \ddots & \\ & & & 1 \end{matrix} & \begin{matrix} 1 & & & \\ & 1 & & \\ & & \ddots & \\ & & & 1 \end{matrix} \\ \hline \alpha^0\alpha^1 \ldots \alpha^{b-1} & \alpha^1\alpha^2 \ldots \alpha^b & \alpha^i\alpha^{i+1} \ldots \alpha^{i+b-1} & \alpha^{2^{r-b}-2}\alpha^0 \ldots \alpha^{b-2} \end{array}\right] \qquad (17)$$

Column vector $\alpha$ is a primitive element in $GF(2^{r-b})$. Denoting by $g(x)$ the minimum function of $\alpha$ and by $T_{(r-b)}$, the companion matrix of $g(x)$, equation (17) can be rewritten as equation (18) as follows using the mathematical notations previously developed:

$$H_{r,b} = \left[ \frac{I_b}{T^0_{(r-b)} \cdot I_{(r-b),b}} \middle| \frac{I_b}{T^1_{(r-b)} \cdot I_{(r-b),b}} \middle| \ldots \middle| \frac{I_b}{T^i_{(r-b)} \cdot I_{(r-b),b}} \middle| \ldots \middle| \frac{I_b}{T^{2^{r-b}-2}_{(r-b)} \cdot I_{(r-b),b}} \right]$$

This matrix is used as a part of the information portion of the parity check matrix we are developing.

It can be shown that the $H_{r,b}$ matrix when used with an identity matrix $I_r$ forms a parity check matrix H which is capable of correcting all single byte errors.

$$H = [H_{r,b} \quad I_r] \qquad (19)$$

It can be seen that each byte starts with the next successively higher column vector designated by the next higher exponent of a $\alpha$ than the previous byte started with.

The information bits are the concatenation of $2^{r-b}-1$ bytes, $B_0, B_1 \ldots B_{2^{r-b}-2}$. The check bits are similarly expressed in terms of check bytes $C_1C_2 \ldots C_k$ where $C_k$ is the special check byte of length $b + c$ as shown in equation (15).

The code word $I = B_0B_1 \ldots B_{2^{r-b}-2}\, C_1C_2 \ldots C_k$ satisfies the relationship which is necessary to develop the syndrome:

$$H \cdot [B_0B_1 \ldots B_{2^{r-b}-2}\, C_1C_2 \ldots C_k]^T = 0 \qquad (20)$$

The corrupted code word I then produces the syndrome S given by:

$$H\hat{I} = S = [S_1S_2S_3 \ldots S_k]^T \qquad (21)$$

where $S_i$ represents the syndrome byte corresponding to the check byte $C_i$. The code capability can be demonstrated by showing that there are distinct syndromes for each distinct single byte-error. First, any error byte in the information portion, say error pattern $E \neq 0$ in the $i^{th}$ byte, gives the following syndrome from equations (18) and (21).

$$S_1 = E \qquad (22)$$

and $$[S_2S_3 \ldots S_k]^T = [T^i_{(r-b)} \cdot I_{(r-b),b}] \cdot E \qquad (23)$$

Since $S_1 = E \neq 0$, the vector $\Phi_{(r-b),b} \cdot E$ is non-zero.

Then by Property 1 of the T matrix it is clear that:

$$[\, S_2 S_3 \ldots S_k \,]^T \neq 0$$

The error byte in the check portion, however, gives the following syndromes. Let $E \neq 0$ be in the $j^{th}$ check byte.

$$S_\lambda = 0, \lambda \neq j \quad (24)$$

and $$S_j = E \neq 0 \quad (25)$$

Hence, an error in the information portion must result in at least two bytes of non-zero syndromes and an error in the check portion results in only one non-zero syndrome byte. Distinct errors in the check portion obviously yield distinct syndromes as seen in equation (24) and (25). Now suppose byte errors $E_1 \neq 0$ and $E_2 \neq 0$ in $i$ and $j^{th}$ $(i \neq j)$ information bytes had identical syndromes, then from equation (22) and equation (23) we have:

$$E_1 = E_2 \quad (26)$$

and $$T^i \cdot \Phi \cdot E_1 = T^j \cdot \Phi \cdot E_2 \quad (27)$$

(Subscripts on T and I are omitted whenever the meaning is clear without them.) Substituting $E_2 = E_1$ in equation (27), $$(T^1 \Phi + T^j \Phi) \cdot E_1 = 0$$

By Corollary 1, this implies $i \equiv j \bmod (2^{(r-b)}-1)$ and since $0 \leqslant i,j \leqslant 2^{r-b}-2$, we have $i=j$. This contradicts the assumption $i \neq j$. This proves that an error in any information byte has a distinct syndrome. Furthermore, the error pattern is given by the syndrome byte $S_1$ as seen from equation (22).

It can be shown that the code described by the following parity check matrix H corrects all single byte errors where $r \geqslant 3b$.

$$H = [\, H_{r,b} \mid O_{b,b(2^{r-2b}}-1/H_{(r-b),b} \mid I_r \,] \quad (28)$$

The information portions corresponding to $H_{r,b}$ and $H_{(r-b),b}$ can be called the first and second partition of information bytes. An error byte in the first partition yields $S_1 \neq 0$ and at least one more non-zero syndrome byte. An error byte in the second partition yields $S_1 = 0$, $S_2 \neq 0$ and at least one more non-zero syndrome byte, since $H_{(r-b),b}$ itself is a single byte error correcting code for r−b check bits. An error byte in the check portion yields one and only one non-zero syndrome byte. Distinct byte errors in the same partition yield distinct syndromes as was previously proved.

It will be appreciated that an iterative concatenation of single error correction submatrices $H_{r,b}$; $H_{(r-b),b}$ are possible defining partitions as can be seen from equation (28), maintaining the single byte error correcting capability.

There are limits as to how far the iteration can be carried out. For example, any non-trivial byte error correcting code must have at least one information byte in addition to the check bytes. Suppose the code denoted by the following parity check matrix is a non-trivial single byte error correcting code.

$$H = [\, v_1, v_2 \ldots v_b \mid w_1, w_2 \ldots w_b \mid \,] \quad (29)$$

where $v_i$ and $w_i$ are length r column vectors. All error patterns in the first byte produce $2^1-1$ non-zero distinct syndromes. These syndromes can be viewed as a b-dimensional vector space V, spanned by $v_1, v_2, \ldots v_b$. The error patterns in the second byte also generate syndromes that is another dimensional vector space W. Furthermore, V and W must be disjoint for the code to be single byte error correcting. Hence, the dimensions:

$$\begin{aligned} \dim(V+W) &= \dim(V) + \dim(W) - \dim(V \cap W) \\ &= \dim(V) + \dim(W) \\ &= 2b \end{aligned}$$

which implies that $r \geqslant \dim(V+W) = 2b$. Accordingly, any non-trivial byte error correcting code must have $r \geqslant 2b$. For $r < 2b$ the trivial code is given by $H = [I_r\,]$.

In view of the above, it can be seen that, for given $r = kb + c$ check bits $(0 \leqslant c < b)$, $H_{(2b+c),b}$ is the smallest such single byte error correcting code with $2b+c$ check bits. This establishes the limit of iterative concatenation.

The code of the invention is generated in accordance with the following parity check matrix H, where the check portion $I_r$ is divided into bytes according to equation (15).

$$H = \overset{\updownarrow}{r} \; \begin{matrix} \updownarrow b \\ \updownarrow r-b \end{matrix} \left[ \begin{array}{c|c|c|c|c|c} H_{r\,b} & \begin{array}{c} O_{bx} \\ \hline H_{(r-b),b} \end{array} & \begin{array}{c} O_{bx} \\ \hline O_{bx} \\ \hline H_{(r-2b),b} \end{array} & \cdots & \begin{array}{c} O_{bx} \\ \hline O_{bx} \\ \hline \vdots \\ O_{bx} \\ \hline H_{(2b+c),b} \end{array} & I_r \end{array} \right] \quad (30)$$

$$H = [P_1 | P_2 | \ldots | P_{k-1} | I_r] \quad (31)$$

The second form shown above is to define $k$-1 partitions for the information portion. Each partition $P_j$ contains $bx(2^{(k-j)b+c}-1)$ columns.

From the above, it can be seen that the information message can be coded in accordance with the above defined H matrix. The H matrix is partitioned and each partition includes a submatrix $H_{(r-jb),b}$ which, as defined previously, is individually capable of performing single byte error correction. The submatrices are iteratively concatenated as shown above to form the required H matrix.

The check bits are added in the last partition in the form of an identity matrix $I_r$. It should be appreciated that as the message gets longer, the code becomes more efficient since each check bit is successively performing its function with respect to a longer message portion.

It can be shown that a message encoded according to the matrix H can correct all single byte errors in the message. Any two distinct errors within a partition or within the check portion yields distinct syndromes as was previously proved. A single error E $\neq$ 0 in the $i^{th}$ byte of partition $P_j$ yields the syndrome:

$$S_1 = S_2 = \ldots = s_{j-1} = 0$$

and $$[\ S_{j+1} \ldots S_k\ ]^T = [\ T^i_{(r-jb)} I_{(r-jb),b}\ ] \cdot E \neq 0 \quad (32)$$

which is distinct from the syndrome of any single byte error in another partition or the check portion.

A code is called perfect if all possible $2^r$ syndromes are used to correct $2^r$ distinct error patterns. (No-error is considered as an error pattern.) A code is called maximal if there does not exist a longer code with the same error correcting capability for a given $r$. Defining $M_1$ as the number of distinct error patterns, the code can correct for given $r$. We can write from the equations (15), (16) and (30), where $r \geqslant 2b$, that:

$$M_1 = \sum_{j=1}^{k-1} (2^b-1)(2^{(k-j)b+c}-1) + (k-1)(2^b-1) + (2^{b+c}-1) + 1$$

where the first summation term sums over all the partitions the product of the number of bytes and the number of non-zero patterns per byte which is $2^b-1$. The second term is for the ($k$-1) regular size check bytes and the third term reflects the special check byte. The last 1 is to accommodate the "no-error" situation. Rewriting:

$$M_1 = (2^b-1) \sum_{i=1}^{k-1} 2^{ib+c} + 2^{b+c}$$

$$= 2^{b+c}(2^b-1)\frac{2^{(k-1)b}-1}{2^b-1} + 2^b$$

$$= 2^r \quad (35)$$

This proves that the code is a perfect code.

Thus, the structure of the code is presented in terms of an H matrix having iterative concatenation of submatrices defining partitions. Each partition defines a byte error correction code by itself, which in turn is described in terms of a generating primitive polynomial and its companion matrix. The bytes are considered as a convenient cluster of individual bits rather than a symbol from $GF(2^b)$, and hence, the byte size b does not have to divide the number of check bits $r$.

Figure 2:
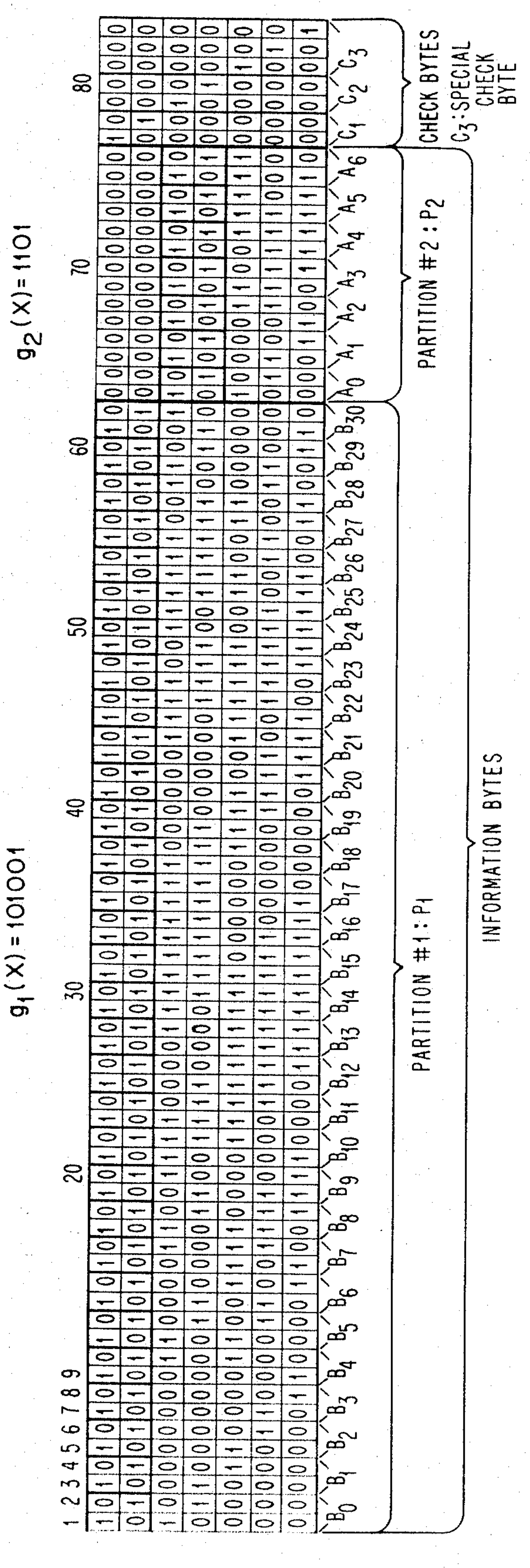
FIG. 2 is an illustrative H matrix showing the partitioning and the offsetting or stepping of the successively connected submatrices.

Returning now from the theoretical general case to a specific embodiment of the invention, FIG. 2 shows the parity check matrix of the code for the byte length $b = 2$ and the check bits $r = 7$. The submatrix forming the first partition $P_1$ of the information portion of the H matrix is generated by the degree 5 primitive polynomial $g_1(x) = 1 + x^2 + x^5 = 101001$. It will be recalled from the previous theoretical discussion that the column vectors $\alpha$ are primitive elements in $GF(2^{r-b})$. In this case, $r-b = 5$ and thus the degree 5 primitive polynomial is used to generate the submatrix in the first partition $P_1$. The actual columns of the submatrix in the first partition are obtained from the following values of $\alpha$:

$\alpha = 01000$ $\alpha^2 = 00100$ $\alpha^3 = 00010$ $\alpha^4 = 00001$ $\alpha^5 = 10100$

.

.

.

$\alpha^{31} = 01001$

These values of $\alpha$ are generated by considering the binary number as being shifted by one bit to the right and the last bit shifted out being inserted as the first bit if the bit is "0." If the bit being shifted out is a "1," then the primitive polynomial value 101001 is EXCLUSIVE OR'ed to the content.

Figure 3:
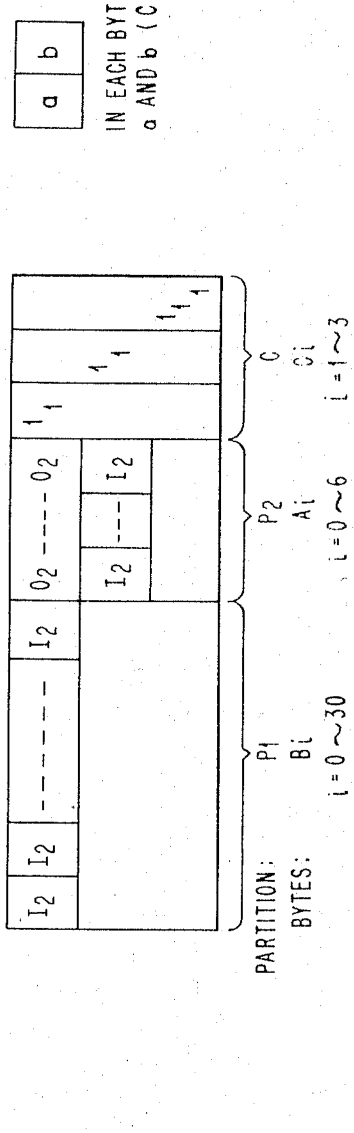
FIG. 3 is a schematic diagram showing more clearly the arrangement of the H matrix or the parity check matrix of FIG. 2.

The number of bytes included in the first partition $P_1$ is $2^5-1 = 31$, which represents 62 information bits. Likewise, the second partition $P_2$ of the information portion of the matrix is generated by the degree 3 primitive polynomial $g_2(x)=1+x+x^3=1101$. The degree 3 primitive polynomial was selected since the second partition $P_2$ has $H_{r-b}$ with $\alpha$'s from $GF(2^{4-2b})$ which gives 3, when $r = 7$ and $b = 2$. The number of bytes in the second partition is $2^3-1 = 7$, which represents 14 information bits. $B_0 - B_{30}$ denotes the bytes of the first partition $P_1$ and $A_0 - A_6$ denote the bytes of the second partition $P_2$. The check portion C of the overall H matrix is comprised of three separate bytes $C_1$, $C_2$ and $C_3$ of which the last check byte $C_3$ is a special size byte of length 3. The code specified by this parity check matrix is a perfect byte-error-correcting code with 7 check bits according to the theory previously described. The bits within a 2 bit byte are further designated by calling the left bit of a byte $a$ and the right bit of a byte $b$. FIG. 3 is a schematic representation of the parity check matrix of FIG. 2 showing the three partitions $P_1$, $P_2$ and C and the byte and bit designation. It can be seen, that the submatrices include identiy matrices $I_b$ of two bit lengths. The second submatrix, defining the second partition $P_2$, generated as denoted above, is concatenated or added to the submatrix of the first partition $P_1$ as shown. Thus, in this case, the second submatrix which is added to the first submatrix is (iteratively) stepped down with respect to the first submatrix in the first partition $P_1$ by two bits. The remaining bit spaces are filled with 0's. This iterative concatenation of matrices can be carried out to the limits previously defined in the theoretical discussion. The third partition C of the overall H matrix consists of an identiy matrix $I_7$ which, in this case, is broken down into the first and second bytes $C_1$, $C_2$ with a special third byte $C_3$ of 3 bits.

Figure 4:
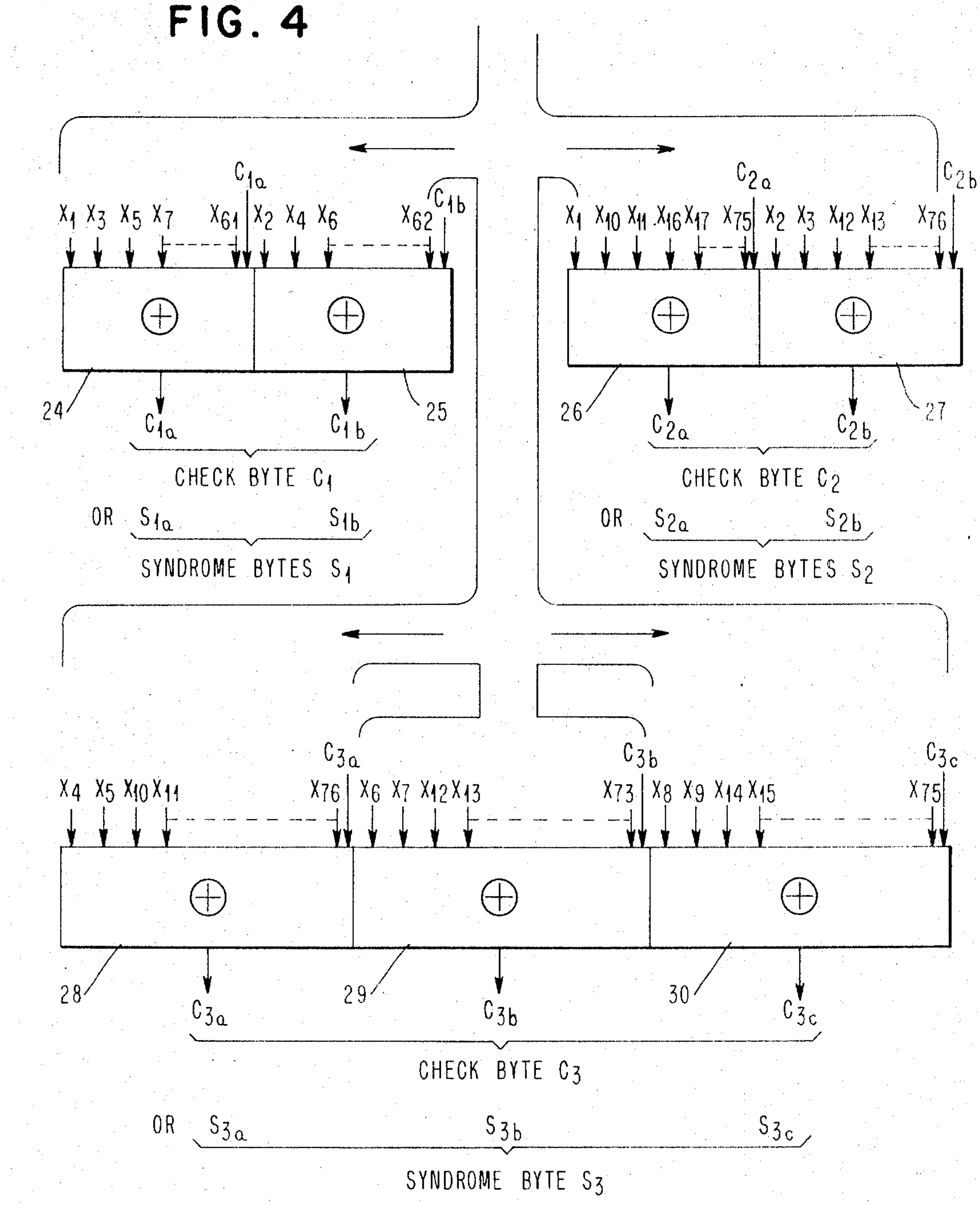
FIG. 4 is a schematic diagram of a logic circuit capable of generating the check/syndrome bits.

As was previously mentioned, it is necessary to encode the incoming message in such a way that it can be simple and quickly decoded. The circuit shown in FIG. 4 is a combinational logic check or syndrome generation circuit. The encoding is accomplished by entering the 76 information bits $x$ (or 38 information bytes) into the appropriate EXCLUSIVE OR circuits 24, 25, 26, 27, 28, 29 and 30. During this time, the check bit inputs are set to logical 0. The connection to the EXCLUSIVE OR circuits for each check bit is according to the parity check matrix of FIG. 2. For example, the EXCLUSIVE OR circuit 27 for $C_{2b}$ has as inputs the 40 bits that appear as logical 1's in the fourth row of the parity check matrix which corresponds to $C_{2b}$. Actually, the EXCLUSIVE ORing function determines the parity of all the inputs bits. Thus, it will be appreciated that EXCLUSIVE OR circuit 27 generates the check bit $C_{2b}$. Likewise, information bits $x_1$, $x_{10}$, $x_{11}$, etc. as can be determined by the 1's in the third row of the matrix shown in FIG. 2 are connected as inputs to EXCLUSIVE OR circuit 26 to produce as an output check bit $C_{2a}$. These two outputs $C_{2a}$ and $C_{2b}$ form the check byte $C_2$. Once the check bits are generated, the encoding is complete and the generated check bits are added to the information which is then utilized.

The code word during utilization or transmission is subject to the introduction of errors which can be corrected up to b-bits in length. In the case under discussion, $b$ is equal to 2, thus, a byte of 2 bits in error can be corrected. The location of the errors is determined by the decoding.

The decoding of the received message is accomplished by generating the syndrome bits (byte) from the received code word. The syndrome generator 16 is also shown in FIG. 4. The syndrome is generated according to the 1's of appropriate rows in the matrix of FIG. 1 and, thus, the syndrome byte $S_1$ and $S_2$ and $S_3$ is generated by the same circuitry as the check bytes $C_1$, $C_2$ and $C_3$. In the generation of the syndromes, the check bits are entered into the appropriate EXCLUSIVE OR circuits as shown in FIG. 4. The syndrome bytes $S_1$, $S_2$ and $S_3$, are comprised of bits $S_{1a}$ and $S_{1b}$; $S_{2a}$ and $S_{2b}$; and $S_{3a}$, $S_{3b}$ and $S_{3c}$; respectively.

Figure 5:
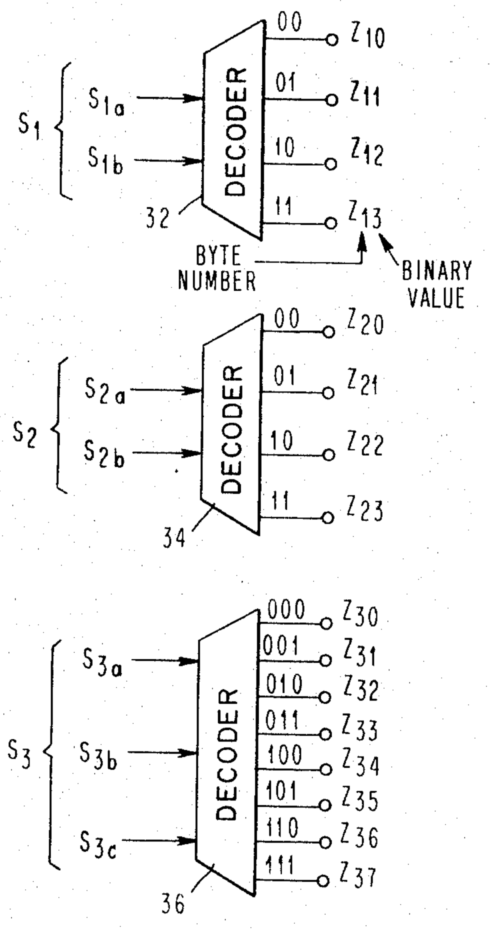
FIG. 5 is a schematic diagram of the decoder for the syndrome.
Figure 6:
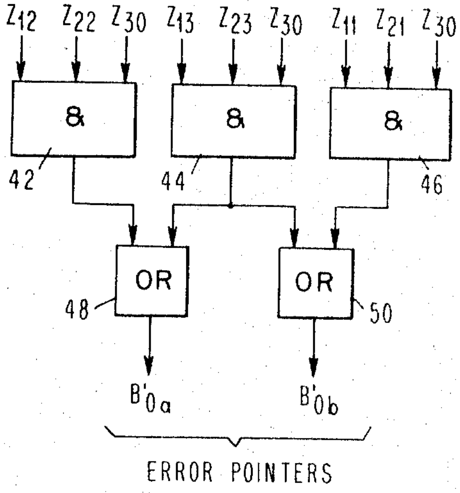
FIG. 6 is a block diagram showing an arrangement which can be used in the invention for generating the information error pointers.
Figure 8:
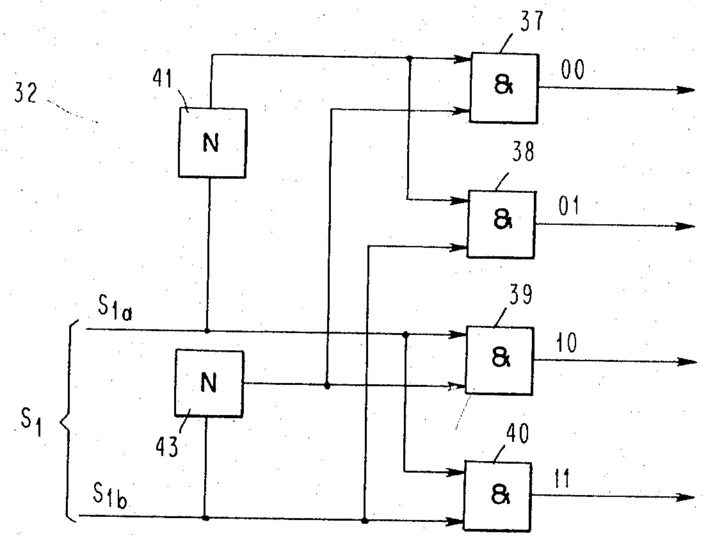
FIG. 8 is a schematic diagram showing a decoder for the syndrome decoder of FIG. 5.

The syndrome bit outputs of the syndrome generator of FIG. 4 are connected as inputs to the syndrome decoder 18 shown in FIG. 5. The $S_1$ syndrome byte is fed to decoder 32 and the $S_2$ and $S_3$ bytes are fed to decoders 34 and 36, respectively. The decoders break down the syndrome bit inputs into the maximum combination of the inputs. For example, the two inputs $S_{1a}$ and $S_{1b}$ to decoder 32 are broken down into the various maximum possible combinations of 0's and 1's. That is 00, 01, 10 and 11. Accordingly, the outputs of the decoders are designated by the symbols $Z_{ij}$ where $i$ denotes the number of the syndrome byte and $j$ denotes the binary value of the decoder outputs. The actual circuitry of the decoders is well known. For example, the decoder 32 is shown in FIG. 8. The two inputs $s_{1a}$ and $S_{1b}$ require four AND gates 37,38,39 and 40 and two NOT gates 41 and 43, which merely produce the inverse of the input. It can be seen that input $S_{1a}$ will provide a 0 input to AND circuit 37 because of the inverting performed by NOT circuit 41. Likewise, input $S_{1b}$ provides a 0 input to AND circuit 37 giving the output which is desingated 00. The various other connections to the AND circuits can be traced which produce the indicated outputs therefrom. Decoder circuit 34 is exactly the same as decoder circuit 32. Decoder 36 is an extension of the theory applied to decoder circuits 32 and 34 so that three inputs can be decoded. These decoder outputs $Z_{10} - Z_{37}$ are connected as inputs to the error pointer generator 20. The error pointer generator for each information byte is comprised of three 3-input AND gates, 42,44 and 46 and two 2-input OR gates 48 and 50 as shown in FIG. 6. For each byte, the first AND gate 42 receives as inputs the encoded version of the left column of the corresponding byte in the parity check matrix of FIG. 2. For example, in byte $B_0$, the left column is 1010000 and hence, the error pattern of the bit, $B_{0a}$ yields the syndrome bytes $S_1 = 10$, $S_2 = 10$ and $S_3 = 000$. Accordingly, the first AND gate 42 of the error pointer generator 20 of FIG. 6 receives as inputs $Z_{12}$, $Z_{22}$, and $Z_{30}$ from the syndrome decoder. These input connections are made in accordance with the decoded output of the decoder. For example, $Z_{12}$ corresponds to 1 followed by a 0. Thus, it can be seen that this corresponds to the 10 output of decoder circuit 32. Similarly, the other inputs to the first AND gate 42 of the error pointer generator are $Z_{22}$ and $Z_{30}$. The third AND gate 46 receives inputs from the decoder representative of the right bit of the byte in a manner similar to that described for the left bit. For example, the bit $B_{0b}$ corresponds to the right column of $B_0$ of the parity check matrix which is 010100 and, accordingly, the inputs to the third AND gate are $Z_{11}$, $Z_{21}$ and $Z_{30}$. The AND gate 44 shown as the center AND gate of FIG. 6 recognizes the syndrome of errors in both bits of the respective byte. In order to determine the connections to this middle AND gate 44, both columns of the byte of the parity check matrix are bit by bit EXCLUSIVE OR'ed with one another to find the appropriate connection to be made to the middle AND gate 44. Using $B_0$ as an example of a representative byte, again, the bit by bit EXCLUSIVE OR sum of the two columns yields 1111000 which, decoded as was previously suggested, provides $Z_{13}$, $Z_{23}$ and $Z_{30}$ as inputs to this middle AND gate 44. The byte $B_0$ columns of the H matrix are reproduced below for convenience showing the results of the bit by bit EXCLUSIVE ORing:

$$S_1 \begin{cases} 1 \oplus 0 = 1 \\ 0 \oplus 1 = 1 \end{cases}$$
$$S_2 \begin{cases} 1 \oplus 0 = 1 \\ 0 \oplus 1 = 1 \end{cases}$$
$$S_3 \begin{cases} 0 \oplus 0 = 0 \\ 0 \oplus 0 = 0 \\ 0 \oplus 0 = 0 \end{cases}$$

The result of EXCLUSIVE ORing bit by bit results in the column of 1111000 which is separated into the $S_1$, $S_2$ and $S_3$ syndromes. Referring to the decoder, in FIG. 5, it can be seen that the 11 designated output of the decoder circuit corresponds to $Z_{13}$ and the 11 output of decoder 34 corresponds to $Z_{23}$, while 000 of decoder 36 corresponds to $Z_{30}$. The output of the first and second AND gates 42, 44 of the error pointer generator 20 of FIG. 6 are connected to an OR gate 48 whose output is the first or left bit $B'_{0a}$. Likewise, the same output of the second AND gate 44 and the output of the third AND gate 46 are connected to an OR gate 50 which produces as an output the second bit of the byte $B'_{0b}$.

Thus, we have error pointers for the individuals bits of each byte. The left bit pointer, which is the output from the first OR gate 48, is on if the error was in the left bit alone or if the error was in both bits of the byte. Likewise, the output of the second OR gate 50 is on if the right bit was in error or if both bits are in error. An error pointer circuit 20 as just described is provided for each byte of the parity check matrix.

Figure 6A:
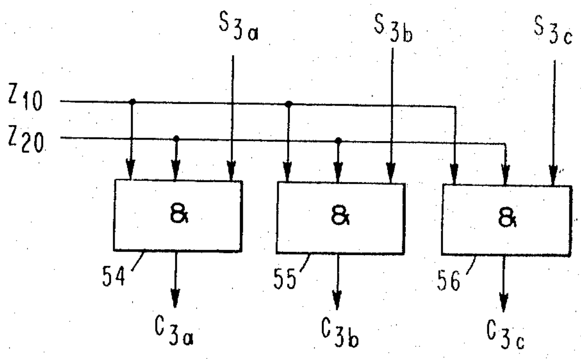
FIG. 6a is a further block diagram showing the logic circuit arrangement for generating the error pointers for the check byte.

If it is desired to include error correction for the check bytes, an optional error pointer generator for the check bytes can be included. These pointers are constructed in a like manner as the pointers for any information byte described above, except for the third special size check byte $C_3$ which contains three bits. The circuit generating the optional error pointers for the check byte $C_3$ is shown in FIG. 6a. $Z_{10}$ and $Z_{20}$ are inputted to each of the three AND circutis 54, 55 and 56. The syndrome bits generated in the syndrome generator $S_{3a}$, $S_{3b}$ and $S_{3c}$ are inputted to the respective AND circuits. Thus, it can be seen that an all 0 input to any one of the AND circuits will produce a 1 output indicating that an error in the check bit has occurred. Likewise, a 0 output at $C_{3a}$, $C_{3b}$ and $C_{3c}$ indicates that the check bit is a 1 and is therefore correct. All of these error pointers are utilized in the error corrector circuit 22 to logically invert the error or errors that are pointed to by the error pointers. This logical inversion can be accomplished by simple individual EXCLUSIVE OR circuits 60 which have inputted thereto, the information or check bit along with the corresponding error pointer. It will be appreciated that the EXCLUSIVE OR circuits 60 provide the logical inversion of the information bit when the pointer bit is energized. For example, selecting the EXCLUSIVE OR circuit 60 to which is inputted the information bit $B_{0b}$ and the error pointer $B'_{0b}$ and assuming the various possible situations, that is, that $B'_{0b}$ pointer information does not indicate an error, that is, this input is 0, then the information bit whether it is, this input is 0, then the information bit whether it be 0 or 1, will be outputted by the EXCLUSIVE OR circuit. Accordingly, if the $B'_{0b}$ pointer information indicates that there is an error, that is, the pointer output is a 1, then the information bit whether it be a 0 or a 1 is inverted by the EXCLUSIVE OR circuit.

Figure 7:
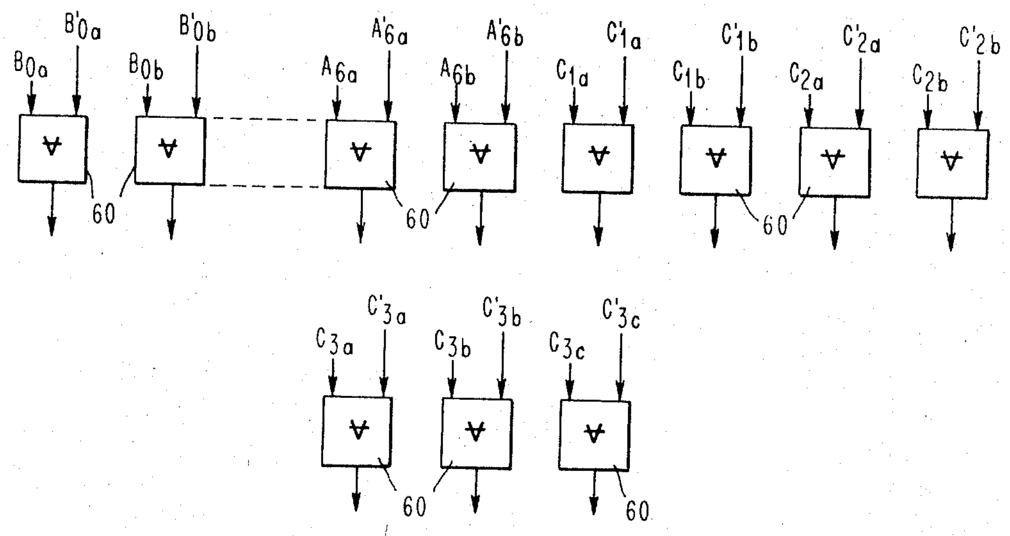
FIG. 7 is a schematic logic diagram showing the error corrector arrangement.

It can be seen from the parity check matrix of FIG. 2, that the maximum number of inputs to any one EXCLUSIVE OR circuit is 40. An EXCLUSIVE OR circuit of this type can be mechanized by $\log_2 40$ approximately equal to 6 levels of a 2-input EXCLUSIVE OR gate tree network. In the error pointer generation, there is an additional level of AND gates. Also in the syndrome decoder circuits for FIG. 5, there is an additional level of AND gates. There are two additional levels of AND and OR GATES in the error pointer generation circuits of FIG. 6. There is also another logic level of EXCLUSIVE OR circuits in the error corrector of FIG. 7. Therefore, it takes ten logic levels of delay from the reception of the code word till the generation of the error correction. In current technology, this represents less than 0.1 microseconds of delay. A delay circuit 92 (FIG. 1) is included at the input line to the error corrector 22 to bring the information and check bits into the EXCLUSIVE OR circuits 60 of the error corrector 22 in synchronism with the information and check bit error pointers from the error pointer generator 20.

While the invention has been particularly shown and described with reference to a preferred embodiment thereof, it will be understood by those skilled in the art that various changes in form and detail may be made therein without departing from the spirit and scope of the invention.

What is claimed is:

1. An error correction system for correcting up to b-adjacent errors in a *b* bit byte of a byte oriented binary message comprising:

means for encoding a sequence of message bytes by adding a plurality of check bytes to the message in accordance with the matrix H which contains submatrices each of which operates on distinct partioned portions of the sequence of message bytes;

means for utilizing said encoded sequence of message bytes;

means for decoding the utilized sequence of message bytes;

said decoding means including a syndrome generator for generating a plurality of syndrome bytes from said received message sequence in accordance with said matrix H;

syndrome decoding means for decoding each byte of said syndrome;

error pointer generating means responsive to said syndrome decoding means for indicating the bits in error within a single byte when all other bytes are error free; and means for correcting the bits in error determined by said error pointers.

2. An error correction system according to claim 1, wherein said means for encoding a sequence of message bytes includes a logical EXCLUSIVE OR circuit for each bit in a byte, the logical EXCLUSIVE OR circuit being common to the same bit in all bytes of a partition of the message, each of said common bit logical EXCLUSIVE OR circuits producing an output which is a bit in a check byte.

3. An error correction system according to claim 1, wherein said encoding means matrix H submatrices are each generated according to a primitive generator polynomial of degree $r-jb$ ($j$=1, 2, . . . ), generating the elements of Galois Field $GF(2^{r-jb})$ where r is the number of check bits, $b$ is the byte length, and $r \geq 2b$.

4. An error correction system according to claim 3, wherein said encoding means matrix H submatrices are iteratively concatenated, the iteration being in steps of b and the concatenation extending to the smallest submatrix $H_{(2b+c),b}$ where $r = kb+c$ check bits and $0 \leq c < b$.

5. An error correction system according to claim 4, wherein each of the encoding means matrix H submatrices define a check byte partition in the H matrix, said check bytes generated in accordance with said H matrix are attached to the end of said encoded message forming the check byte partition.

6. An error correction system according to claim 1, wherein said syndrome generator includes a logical EXCLUSIVE OR circuit for each bit in each byte of the message and each bit in each byte of the check bytes, the logical EXCLUSIVE OR circuit being common to the same bit in all bytes of a partition of the message and the corresponding bit in the corresponding check byte, each of said common bit logical OR circuits producing an output which is a bit in a syndrome byte.

7. An error correction system according to claim 1, wherein said syndrome decoding means for decoding each byte of said syndrome includes a plurality of AND and NOT gates for converting *b* syndrome bits into all possible binary combinations of *b* bits.

8. An error correction system according to claim 7, wherein said error pointer generating means responsive to said syndrome decoding means includes a plurality of AND gates, one for each bit in each byte plus $2^b-1-b$ additional AND gates per byte, the inputs to the plurality of AND gates from the syndrome decoder circuits are determined in accordance with the binary sequences of the columns of the matrix H representing the byte being decoded, the additional AND gates having inputs determined in accordance with the modulo 2 sum of the corresponding bits in the respective columns of the byte, and OR circuits each having as an input thereto the output of one of said pluraltiy of AND circuits and the output of said additional AND circuits to produce an output therefrom indicative of an error in the corresponding bit of said byte.

9. An error correction system according to claim 1, wherein said means for correcting the bits in error includes a plurality of EXCLUSIVE OR circuits each having as an input thereto one of the error pointer bits and the corresponding bit from said utilized message, the output therefrom being the corrected information bit.

* * * * *